(12) United States Patent
Arnold et al.

(10) Patent No.: US 7,354,468 B2
(45) Date of Patent: Apr. 8, 2008

(54) COMPACT CYCLONIC SEPARATION DEVICE

(75) Inventors: Adrian Christopher Arnold, Brentor (GB); Arthur John Arnold, Okehampton (GB)

(73) Assignee: Euro-Pro Operating, LLC, West Newton, MA (US)

( * ) Notice: Subject to any disclaimer, the term of this patent is extended or adjusted under 35 U.S.C. 154(b) by 452 days.

(21) Appl. No.: 11/009,307

(22) Filed: Dec. 10, 2004

(65) Prior Publication Data

US 2006/0042206 A1   Mar. 2, 2006

Related U.S. Application Data

(63) Continuation-in-part of application No. 10/926,609, filed on Aug. 26, 2004.

(51) Int. Cl.
*B01D 45/12* (2006.01)

(52) U.S. Cl. ............... 55/426; 55/459.1; 55/DIG. 3

(58) Field of Classification Search ............. 55/418, 55/426, 459.1, DIG. 3; 15/327.1, 329, 350, 15/353

See application file for complete search history.

(56) References Cited

U.S. PATENT DOCUMENTS 2,678,110 A * 5/1954 Madsen ................ 55/398
4,624,691 A * 11/1986 Schneider ............. 55/396
5,779,745 A   7/1998 Kilstrom
5,950,274 A   9/1999 Kilström
6,192,550 B1  2/2001 Hamada et al.
6,195,835 B1  3/2001 Song et al.
6,766,558 B1* 7/2004 Matsumoto et al. ......... 15/353
7,140,068 B1* 11/2006 Vander Baan et al. ....... 15/347
2003/0121121 A1  7/2003 Nakai et al.
2004/0074213 A1  4/2004 Organ

FOREIGN PATENT DOCUMENTS

EP       1 042 981 A2   10/2000
WO       WO 99/42198    8/1999
WO       WO 02/069778 A1  9/2002

* cited by examiner

*Primary Examiner*—Robert A. Hopkins
(74) *Attorney, Agent, or Firm*—Greenberg Traurig, LLP; Michael I. Wolfson

(57) ABSTRACT

A cyclonic separation device for a vacuum cleaner including a cylindrical housing, an inlet tube parallel to the axis of the housing having a vortex vane disposed axially in the inlet tube. Air rotates in one direction in the inlet tube, and preferably in the opposite direction in the housing. The housing includes a cylindrical sidewall with an upper central outlet tube and a closed bottom for collecting separated dirt. A disrupter ring located on the inside wall of the middle portion of the housing includes a curved surface and sharp edge for lifting air flow off the housing wall. An outlet tube disc spaced from the inlet of the outlet tube is located in the housing below the disrupter ring.

20 Claims, 7 Drawing Sheets

COMPACT CYCLONIC SEPARATION DEVICE

CROSS-REFERENCE TO RELATED APPLICATIONS

This is a continuation-in-part of U.S. application Ser. No. 10/926,609, filed Aug. 26, 2004, the entire disclosure of which is hereby incorporated by reference.

BACKGROUND OF THE INVENTION

The invention relates to a cyclonic separation device for a vacuum cleaner. More particularly, it relates to a cyclonic separation attachment to be placed on the inlet pipe between the vacuum nozzle and the handle of the inlet pipe to increase the dirt separation and collection of a vacuum cleaner having a rigid inlet pipe.

Cyclonic separating devices for vacuum cleaners have been known for some time. For example, U.S. Pat. No. 6,195,835 to Samsung Kwangju Electronics discloses a vacuum cleaner having a cyclone dust collecting device. Here, the cyclone dust collecting device includes a dirt separating cyclonic chamber with a shroud extending into the chamber having a plurality of holes of a size to prevent the dirt of a predetermined particle size from flowing into the air outlet.

Another example of a cyclonic separation device is disclosed in U.S. Pat. No. 5,950,274 to Aktiengesellschaft Electrolux. The cyclonic separator includes a separation chamber having an upper cylindrical portion and a lower inverted truncated cone which defines a whirl chamber. Dirty air enters the interior of the cylindrical portion and travels down the truncated conical portion before exiting the top. The upside down truncated cone has a lower opening for dirt particles to fall through to be collected in the dirt collecting chamber below.

While the use of either cyclonic separators provides its own advantage, considerations related to the configuration of the vacuum cleaner as a whole may also affect the viability of the design. As the size of the vacuum cleaners becomes smaller and more compact, it becomes increasingly difficult to prevent the air flow from progressing down the inside of the separation chamber from disturbing the dirt collected in the dirt collecting container. This appears to be the reason why the collection chamber in both of the devices described above are relatively elongated. The extended collection chamber enables the air flow to disperse naturally and return to the exhaust without significant re-entrainment. Further, the separation chamber must be removable to allow it to be emptied, cleaned or replaced for the ease of use.

Thus, while these designs represent an improvement in separation of conventional vacuums utilizing bag technology, it remains desirable to provide continued improvements and alternative designs to improve the separation of dirt particles from air in an air separation attachment for a vacuum cleaner.

SUMMARY OF THE INVENTION

Generally speaking, in accordance with the invention, a cyclonic separation attachment for a vacuum cleaner having an elongated compact housing with an inlet opening and an inlet tube with a vane assembly is provided. The housing includes an upper separation potion and a lower dirt collection portion. The vane assembly includes a vertical inlet tube with a vortex vane upstream of the cylindrical housing. A central outlet tube assembly extends into the upper portion of the separation portion of the housing. A decoupling or disrupter ring is located on the inside wall of the housing between the separation portion and the collection portion. An outlet tube disc is suspended from the bottom of the outlet tube and is positioned below the level of disrupter ring. The lower portion of the separation housing collects the dirt and has an openable door for the easy removal of collected dirt.

Accordingly, it is an object of the invention to provide an improved cyclonic dirt separation attachment for a vacuum cleaner.

It is another object of the invention to provide a cyclonic separation attachment having a small and compact housing for mounting on the inlet pipe of a vacuum cleaner.

A further object of the invention is to provide a cyclonic separation attachment having a cylindrical housing that includes a disrupter ring for lifting air off the interior wall of the housing.

Yet another object of the invention is to provide a cyclonic separation attachment having an outlet tube disc spaced apart from a central outlet tube to prevent re-entrainment of separated dirt into the air stream exiting the housing.

Still a further object of the invention is to provide a cyclonic attachment with a cylindrical housing for a mounting on an inlet pipe of a vacuum cleaner having a vortex vane in an inlet tube disposed parallel to the cylindrical housing that imparts spin to the inlet dirt laden air.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE INVENTION

Figure 1:
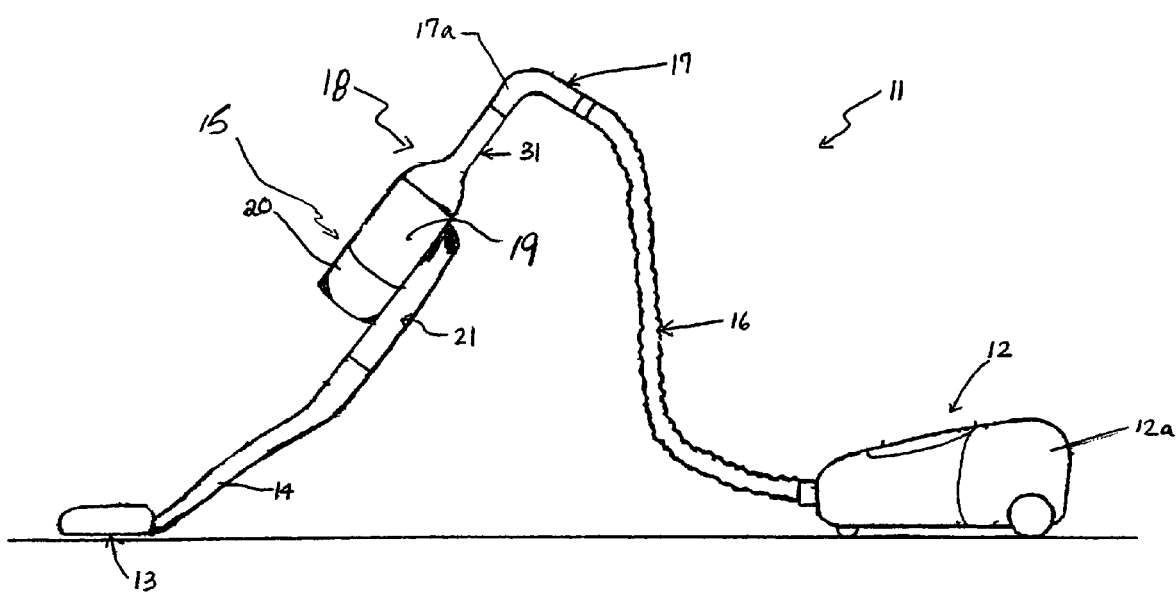
FIG. 1 is a side elevation view of a vacuum cleaner with a removable cyclonic separation device constructed and arranged in accordance with the invention.

FIG. 1 illustrates a canister-type vacuum cleaner 11 having a canister housing 12 including a vacuum source 12a. A floor nozzle dirt collector 13 with a suction opening is connected to a rigid vacuum handle 17 that is connected to housing 12 by a flexible hose 16. Vacuum handle 17 has an inlet pipe section 17a. A cyclonic separation device 18, constructed and arranged in accordance with the invention, is mounted between rigid nozzle pipe section 14 and vacuum handle tube section 17a.

Cyclonic separation device 18 increases the cleaning efficiency by removing dirt from the inlet air before it reaches the filtering and collection elements in housing 12. Cyclonic separation device 18 includes an elongated substantially cylindrical housing 15 having a central axis with an upper separation portion 19 and a lower collection portion 20. A central exhaust pipe 31 is provided above separation portion 19. Inlet air is fed into housing 15 by an inlet tube 21 mounted adjacent to housing 15 with the tubular axis parallel to the axis of housing 15. Cyclonic separation device 18 is mounted between rigid inlet tube 21 and a pipe section 17a. Dirt laden air from nozzle 13 is fed to separation portion 19 and exhaust air exits separation portion 19 through outlet tube 31.

Figure 2:
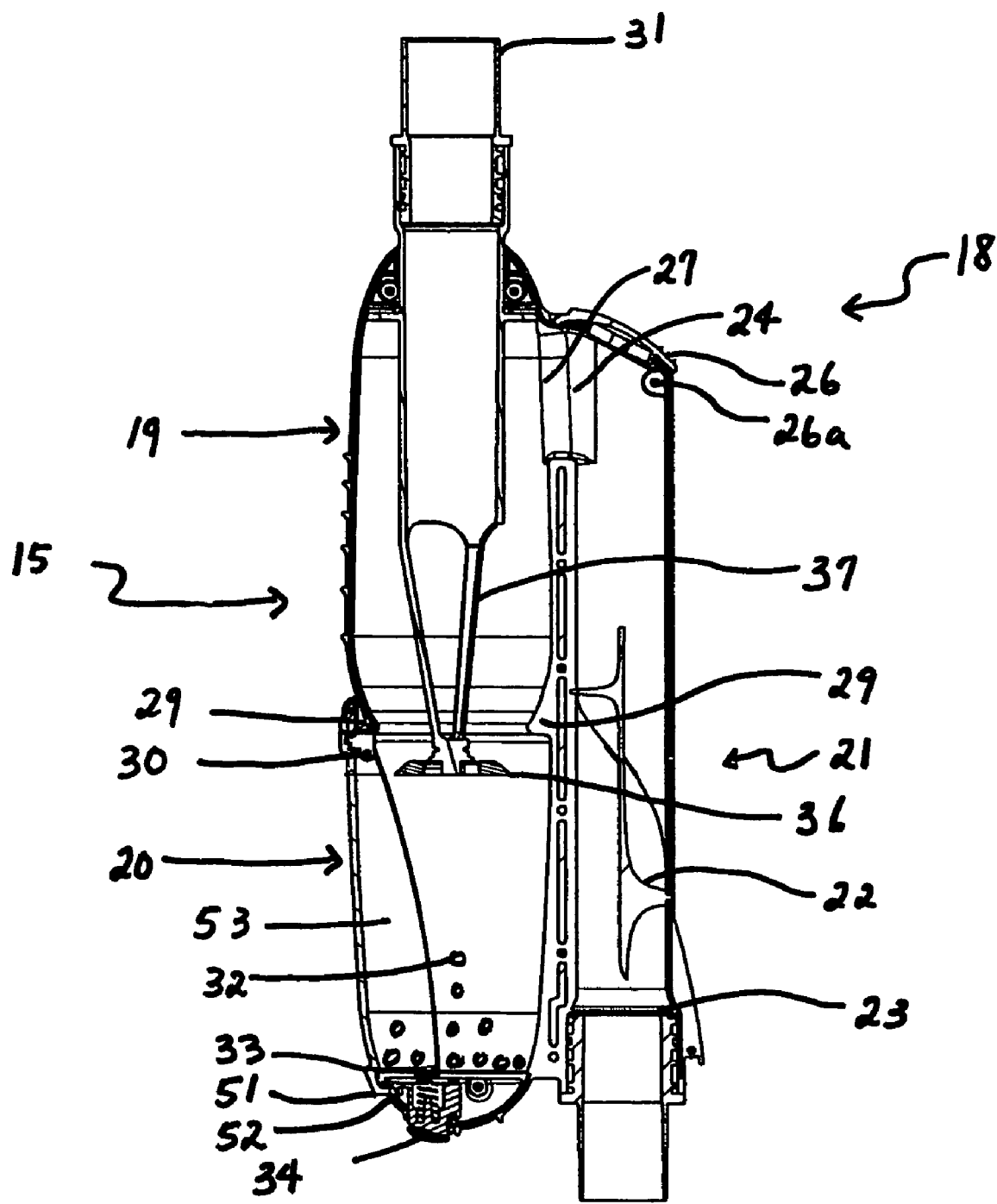
FIG. 2 is a cross-sectional view of the cyclonic separation device with disrupter ring, tube disk and inlet vortex vane of FIG. 1 constructed and arranged in accordance with the invention.

As shown in more detail in the cross-sectional view of FIG. 2, cyclonic separation attachment 18 includes a vortex vane 22 in inlet tube 21. Inlet tube 21 is adjacent to and parallel to cylindrical housing 15 and has an inlet opening 23 and an outlet opening 24 leading into the upper region of separation portion 19 of housing 15 through a transfer region 27 between inlet tube 21 and housing 15. A lid or cap 26 is hingedly connected to the top of inlet tube 21 by a hinge or pin 26a to allow a user to remove any dirt or fibers that become entrained on vane 22 in inlet tube 21.

FIG. 2 further shows that housing 15 has a decoupler/disrupter ring 29 located on the inside wall between upper separation portion 19 and lower collection portion 20. Cylindrical housing 15 also has an outlet tube disc 36, in lower collection portion 20, which is located on the axis of housing 15 below the opening to outlet tube 31 and below the height of disrupter ring 29.

Lower collection portion 20 of housing 15 has a side door 53 that is mounted at the top to housing 15 by a hinge 30 with a release button 34 to facilitate the removal of collected dirt 32. Side door 53 is secured to housing 15 to close collection portion 20 by a lip 51 that engages in a cooperating shoulder 52 of dirt collection portion 20 to secure side door 53 to dirt collection portion 20. Once user presses release button 34, lip 51 is released from housing 15 and pivots clockwise from collection portion 20 and opens at the bottom to allow for the easy removal of dirt collected therein.

Figure 3:
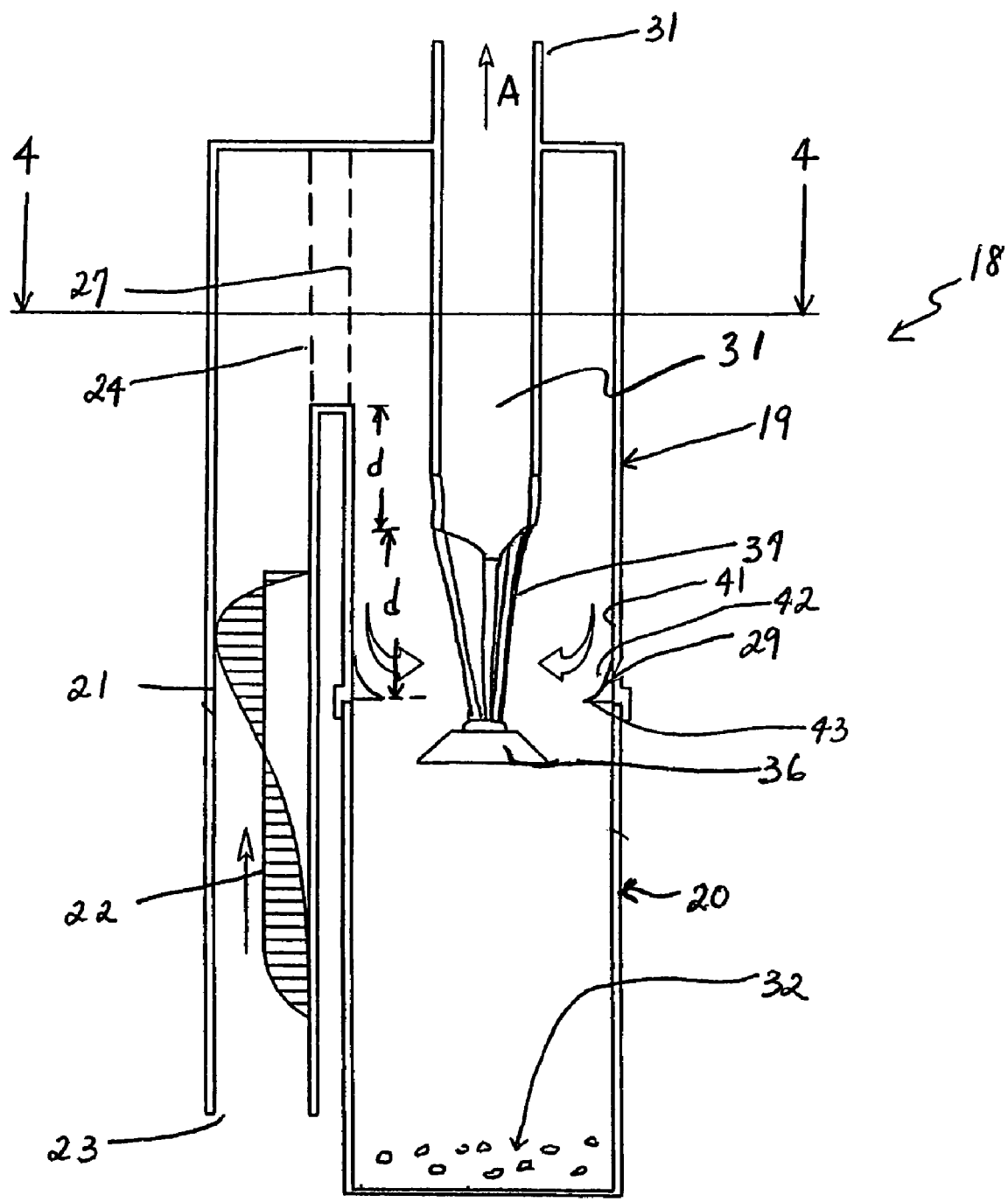
FIG. 3 is a cross-sectional view in schematic showing the air-flow pattern in the inlet and housing.

FIG. 3 shows the air-flow pattern in inlet tube 21 and housing 15. Dirty air enters suction opening of nozzle 13 and passes through pipe 14 and enters inlet tube 21. Vortex vane 22 causes air that enters to rotate axially in inlet tube 21. This forces the dirt particles in the air to move by centrifugal force towards the wall of inlet tube 21 while simultaneously being carried up towards transfer region 27. This allows the dirt particles to leave inlet tube 21 in a thin layer which then passes through transfer region 27 into upper separation portion 19 of cylindrical housing 15 as smoothly as possible. This reduces the amount of turbulence which can cause agglomerated dirt particles to dissociate and reduce efficiency. The radial position of vane 22 may be adjusted by a user so that the thin layer of dirt particles leave the inlet tube without hitting lid 26 of inlet tube 21 and passes directly to transfer region 27. The efficiency of cyclonic separation device 18 is reduced, if the thin layer of dirt particles is deflected by hitting lid 26 or top side of inlet tube 21.

In one embodiment of the invention, vortex vane 22 is an elongated sheet that extends axially within inlet tube 21 and is twisted, but does not cross inlet tube 21. Vane 22 progresses gradually to present a final angle of approximately 60° to the axis at outlet opening 24 of the inlet tube 21 after completing a full 360° turn. While a 60° angle is preferred, the angle may vary from 45° to 75°.

The vane itself, its orientation and its position are important to the operation of this apparatus. In use, air with dirt first meets the vane with its axial orientation and curved end to prevent fibrous material becoming impacted at this point. The vane then progresses gradually to present a final angle of approximately 60° to the axis at the egress after completing a full 360° radially. In this way the pressure loss in the unit is kept as low as possible whilst maintaining maximum angular motion. The vane itself extends from the side wall of the tube out to the centre. It does not cross the tube and is therefore not subject to blockage unless presented with a very large solid object which cannot deform to pass around the vane blade.

Separation portion 19 and collection portion 20 form a substantially cylindrical housing 15 with transfer region 27 leading from outlet opening 24 of inlet tube 21 connecting to the upper separation portion 19 of housing 15. Dirt in inlet tube 21 is ejected into separation portion 19 in a direction that ensures that it meets the inner wall of separation portion 19 in a tangential direction for collection in collection portion 20. Preferably, this is in the opposite direction of rotation than air rotating in inlet tube 21 as it passes over vortex vane 22.

In the illustrated embodiment, decoupler/disrupter ring 29 is located on the inside wall of housing 15 at about the midpoint of housing 15. Thus, separation portion 19 and collection portion 20 are about of equal height. The lower portion of outlet tube 31 extends below the bottom of transfer region 27 a distance of "d" as shown in FIG. 3. Distance d is not critial so long as the entrance to outlet tube 31 is below the bottom of transfer region 27 to avoid any short circuiting of air out of separation portion 19. The distance between the bottom of outlet tube 31 and disrupter ring 29 is generally at least a length d, but may be as long as a distance 5 times d, with a distance of 1.5 to 3 times d being a preferred range.

Disrupter ring 29 is a curved or a frusto-ovoid shape to force the air flow to break away from the inner wall of housing 15. When vacuum source 12a in canister 12 is on, air is drawn from separation portion 19 through upper conduit outlet tube 31. This allows cleaned air to be drawn axially up the upper separation portion 19 into rigid handle 17 along an arrow A to vacuum canister 12 and is collected therein. As the cleaned air is drawn up outlet tube 31, dirt 32 falls into the lower portion of housing 15 in collection portion 20. Side door 53 is mounted to housing 15 by hinge 30 at the upper end with a release button 34 to facilitate the removal of collected dirt 32. Once user presses release button 34, side door 53 is opened and pivots clockwise for the easy removal of dirt collected in collection portion 20.

Collection portion 20 should be at least 50 percent of the length of separation portion 19 and may be as long as desired. In the illustrated embodiment collection chamber 20 is about equal to the length of separation portion 19. A longer collection chamber provides more room to collect dirt. Too short a length will cause dirt 32 to collect too fast and require emptying too often. Collection portion 20 also includes outlet tube disc 36 that is located on the axis of cylindrical housing 15 below the opening to outlet tube 31 and below the height of disrupter ring 29. In this embodiment of the invention outlet tube disc 36 is suspended from the lower open end of outlet tube 31 by a plurality of ribs 37.

Outlet tube disc 36 serves to limit turbulence in lower collection portion 20 and prevent re-entrainment of dirt that has fallen into collection portion 20 into outlet tube 31. In the illustrated embodiment of the invention, outlet tube disc 36 is positioned below disrupter ring 29 a distance about equal to the width of transfer region 27 shown by a width w in FIGS. 4A and 4B for maximum effectiveness. By providing this, any dirt or debris that passes through transfer region 27 can pass by outlet tube disk 36 and fall in collection portion 20.

Figure 4A:
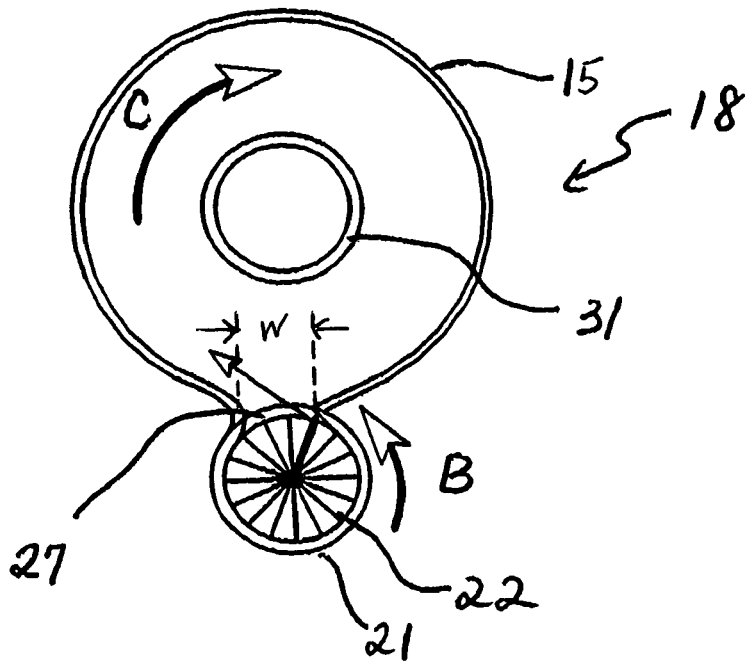
FIGS. 4A and 4B are cross-sectional views of the cyclonic separation attachment showing the dirt-laden air flow pattern in the cyclonic device of FIG. 3 taken along line 4-4.
Figure 4B:
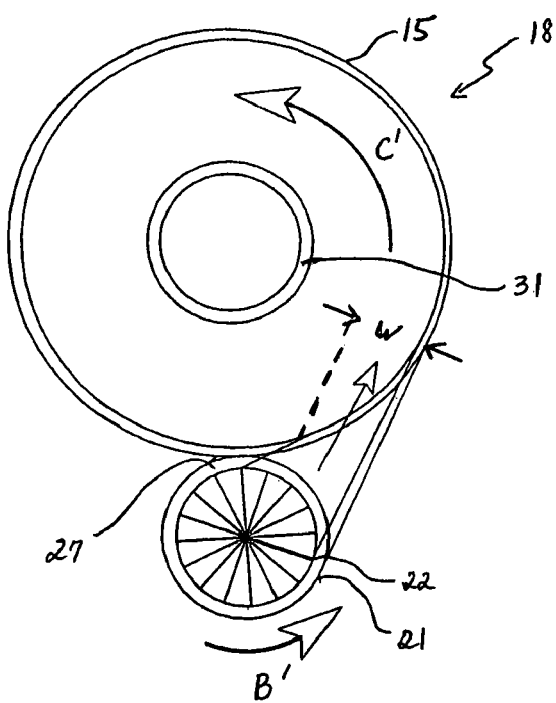

FIGS. 4A and 4B are top cross-sectional views of the cyclonic separation device 18 that shows the direction of the rotation of air flow. In FIG. 4A an arrow B shows incoming air flow in inlet tube 21 to be in a counter-clockwise direction. This airflow is reversed in separation housing 15 as shown by an arrow C after passing through. It is also possible to arrange the outlet opening of inlet tube 21 at transfer region 27 so that air flow can be maintained in the same direction in the inlet tube 21 and the separation housing 15 as shown in FIG. 4B. Here, incoming air rotates in a counter-clockwise direction shown by an arrow B' and in separation housing 15 as shown by an arrow C'.

Figure 5:
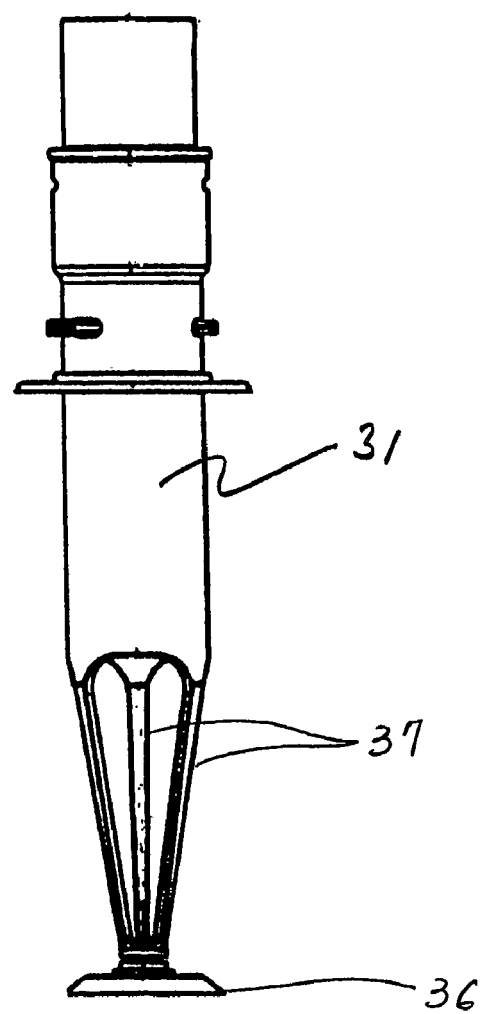
FIG. 5 is a side elevation view of the outlet tube disc of FIG. 2 showing the outlet tube disk suspended by ribs constructed and arranged in accordance with the invention.
Figure 6:
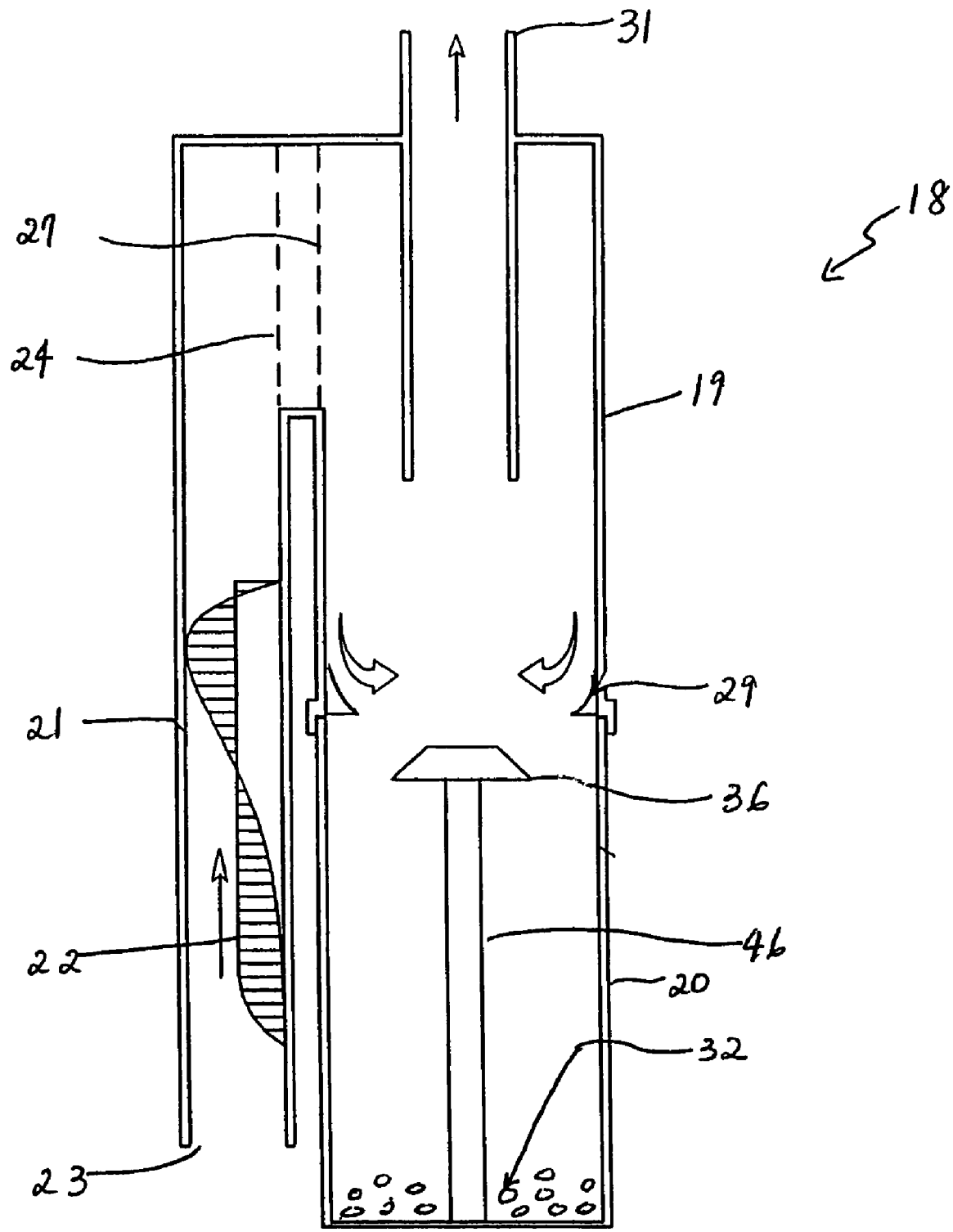
FIG. 6 is a cross-sectional view of a cyclonic separation device in schematic with an outlet tube mounted on a post fixed to the bottom constructed and arranged in accordance with an alternative embodiment of the invention.

FIG. 5 illustrates the embodiment wherein an outlet tube disc 36 is suspended from the lower open end of outlet tube 31 by ribs 37. Outlet tube disc 36 limits turbulence in the collection portion 20 of separation housing 15 and prevents re-entrainment of dirt that has fallen into collection portion 20, into outlet tube 31. In an alternative embodiment, an outlet tube disc 36 is supported by a stem 46 which is attached to the bottom collection portion 20 as illustrated in FIG. 6. Here, dirt-laden air is introduced and dirt is separated in the same manner as in the embodiment illustrated in FIG. 2.

Figure 7:
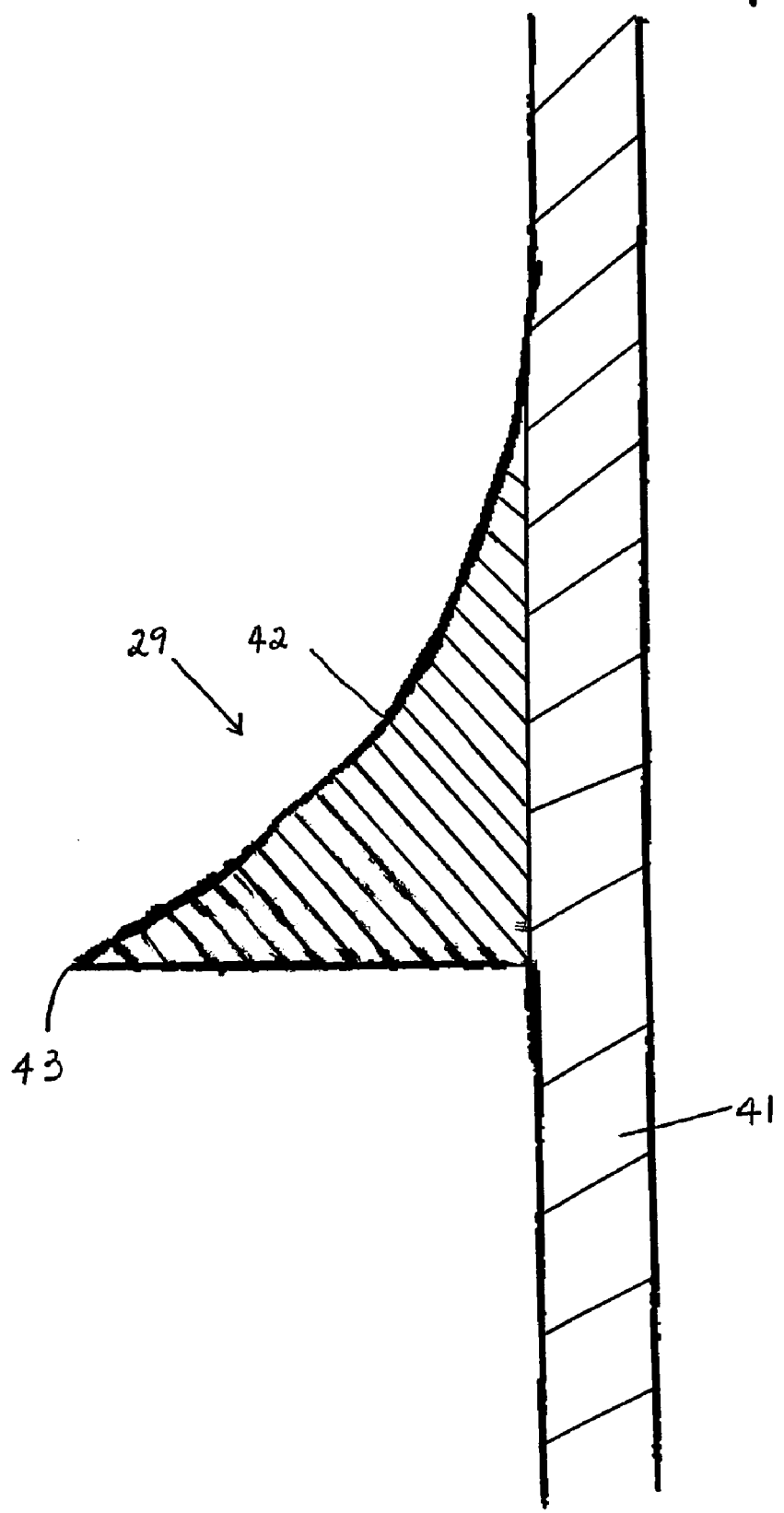
FIG. 7 is a partial cross-sectional view showing the shape of a disrupter ring in accordance with the invention.

Referring now to FIG. 7, disrupter ring 29 is shown in a detailed cross-section view. Ring 29 extends inwardly from sidewall 41 in a gradual arc or curved surface 42 extending outwardly to a relatively sharp edge 43. The shape shown is frusto-ovoid. This insures separation of air flow from wall 41 of housing 15. Disrupter ring 29 may be other shapes than frusto-ovoid. It may be a flange with sharp defined edges. However, in this case dirt may tend to collect at the inner regions of the crease at sidewall 41 and ultimately present the smooth arc shape to the air flow in FIG. 7. Ring 29 should extend inwardly about 10 to 20 percent of the diameter of cylindrical housing 15.

By providing a compact cyclonic separation device as shown and described in accordance with the invention, dirt from incoming dirty air is easily separated and removed. This increases the efficiency of conventional bag-type and bagless canister vacuum cleaners at minimum cost without having to redesign the canister and collection elements. This prevents undue pressure drop across the collection bag and reduces the need to replace bags as often.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawings(s) shall be interpreted as illustrative and not in a limiting sense.

It is also to be understood that the following claims are intended to cover all of the generic and specific features of the invention herein described and all statements of the scope of the invention that as a matter of language, might be said to fall there between.

What is claimed is:

1. A cyclonic separation device for use with a vacuum source, comprising: a cylindrical housing having a cylindrical sidewall with a top and a bottom and a central axis, an inlet at the upper portion of the housing, an outlet at the top and a closed bottom forming an upper separation portion and a lower collection portion;
    a central outlet tube having an inlet in the housing and an outlet communicating with the vacuum source; and the housing having a cylindrical sidewall with a disrupter ring located on the inside wall at a position below the inlet of the outlet tube; and an outlet tube disc positioned below the inlet to the outlet tube at a level below the disupter ring.

2. The cyclonic separation device of claim 1, wherein the central outlet tube extending into the housing and the outlet tube disc is supported by ribs attached to the inlet of central outlet tube.

3. The cyclonic separation device of claim 2, wherein the outlet tube disc is supported in the middle region of the housing by a stem attached to the bottom of the housing.

4. The cyclonic separation device of claim 1, wherein the inlet tube has an openable cleanout cap at the outlet end of the inlet tube.

5. The cyclonic separation device of claim 1, wherein the outer diameter of the outlet tube disc extends to between about 40 to 75 percent of the diameter of the housing.

6. The cyclonic separation device of claim 1, wherein the bottom is selectively openable for removal of dirt collected on the bottom.

7. The cyclonic separation device of claim 1, wherein the selectively openable bottom has a side door that is hingedly connected to the housing for the removal of dirt collected on the bottom.

8. The cyclonic separation device of claim 1, wherein the disrupter ring extends inwardly into the housing between about 3 to 15 percent of the diameter of the housing.

9. A cyclonic separation device for use with a vacuum source, comprising: a cylindrical housing having a central axis, an inlet at the upper portion, an outlet at the top and a selectively openable bottom forming an upper separation portion and a lower collection portion; an inlet tube having an inlet opening and outlet opening positioned adjacent to the housing with an axis of the inlet tube substantially parallel to the central axis of the housing; a vortex vane positioned in the inlet tube causing inlet air therein to circulate; a transfer region at the upper portion of the housing, that is adjacent to the outlet opening of the inlet tube for introduction of circulating air into the housing; a central outlet tube having an inlet in the housing and an outlet communicating with the vacuum source; and the housing having a cylindrical sidewall with a disrupter ring located on the inside wall at a position below the inlet of the outlet tube.

10. The cyclonic separation device of claim 9, including an outlet tube disc positioned below the inlet to the outlet tube at a level below the disrupter ring.

11. The cyclonic separation device of claim 10, wherein the central outlet tube extending into the housing and the outlet tube disc is supported by ribs attached to the inlet of central outlet tube.

12. The cyclonic separation device of claim 10, wherein the outlet tube disc is supported in the middle region of the separation housing by a stem attached to the bottom of the housing.

13. The cyclonic separation device of claim 9, wherein the inlet tube has an openable cleanout cap at the outlet end of the inlet tube.

14. The cyclonic separation device of claim 9, wherein the vortex vane in the inlet tube progresses gradually from a first position at the inlet opening of the inlet tube to the outlet opening of the inlet tube where the guiding vane is between about 45° to 75° from the first position, after having completed a 360° rotation within the inlet tube.

15. The cyclonic separation device of claim 14, wherein the guiding vane is about 60° from the first position.

16. The cyclonic separation device of claim 10, wherein the outer diameter of the outlet tube disc extends to between about 40 to 75 percent of the diameter of the housing.

17. The cyclonic separation device of claim 9, wherein the selectively openable bottom has a side door that is hingedly connected to the housing for the removal of dirt collected on the bottom.

18. The cyclonic separation device of claim 9, wherein the disrupter ring extends inwardly into the housing between about 3 to 15 percent of the diameter of the housing.

19. The cyclonic separation device of claim 9, wherein the vortex vane rotates incoming air in a first direction and air fed into the housing in an opposite direction.

20. The cyclonic separation device of claim 9, wherein the vortex vane rotates incoming air in a first direction and air fed into the housing in the same direction.

* * * * *